United States Patent [19]

Lippi

[11] 3,949,863
[45] Apr. 13, 1976

[54] COMBINATION AUGER SYSTEM
[75] Inventor: Dominic M. Lippi, Luverne, Minn.
[73] Assignee: A. R. Wood Manufacturing Company (Entire), Luverne, Minn.
[22] Filed: Sept. 24, 1974
[21] Appl. No.: 508,763

[52] U.S. Cl................................ 198/104; 198/213
[51] Int. Cl.².................. B65G 33/00; B65G 37/00
[58] Field of Search............. 198/104, 213; 222/413

[56] References Cited
UNITED STATES PATENTS

| | | | |
|---|---|---|---|
| 2,045,757 | 6/1936 | Constantin.......................... | 198/213 |
| 2,191,219 | 2/1940 | Peltz............................... | 198/213 X |
| 2,296,007 | 9/1942 | Weisenberger.................... | 198/213 X |
| 2,569,871 | 10/1951 | Roscoe et al..................... | 198/213 X |
| 3,252,562 | 5/1966 | Brembeck......................... | 198/213 X |

Primary Examiner—Allen N. Knowles
Assistant Examiner—Hadd Lane
Attorney, Agent, or Firm—Clarence A. O'Brien; Harvey B. Jacobson

[57] ABSTRACT

A combination auger system having a coreless, flexible, elevating conveyor joined at the outlet thereof to a core-type distributing conveyor by a coupling assembly providing a transition for material flowing from the coreless conveyor to the core-type conveyor. The coupling assembly includes a core-to-coreless connector having a connecting shaft connected to an end of the core-type auger, and a stub shaft joined with the connecting shaft and approximately two flights of the coreless conveyor. The core-to-coreless connector is arranged in a housing having a section thereof transverse to the path formed by the conveyors, which section is larger than the corresponding sections of the conveyors themselves for permitting the material being conveyed to boil and take a position outside a core of the core-type auger. This is desirable since the space of the core of the core-type auger is unavailable to the material.

3 Claims, 9 Drawing Figures

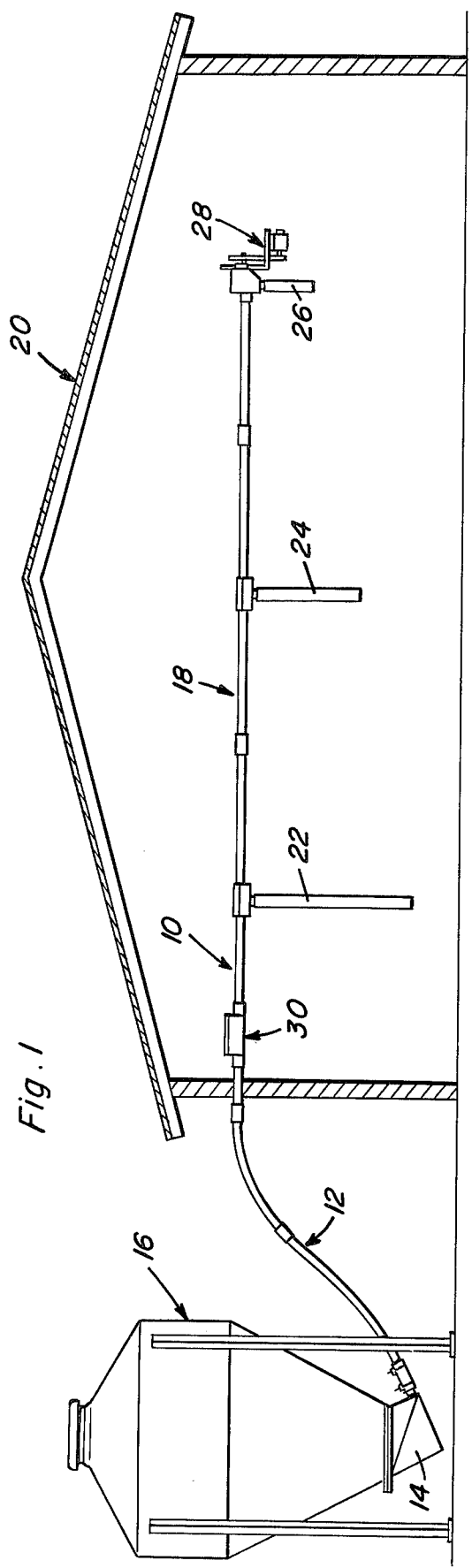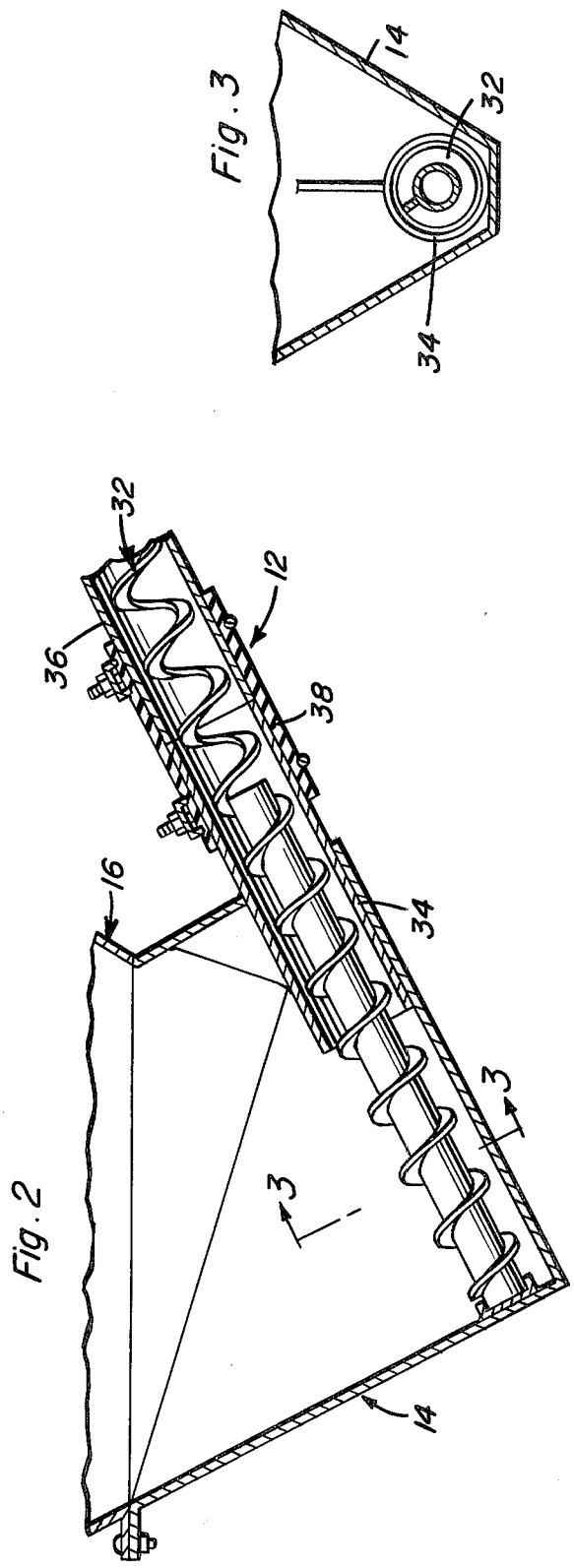

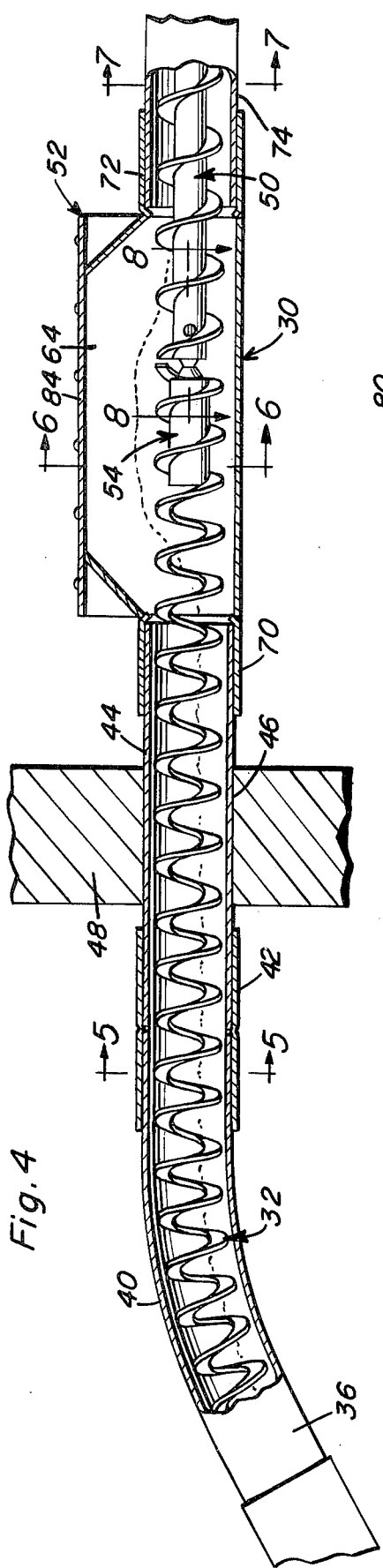
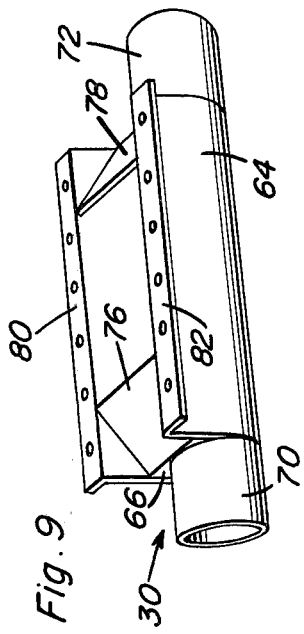
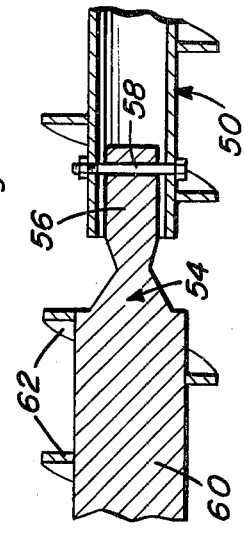
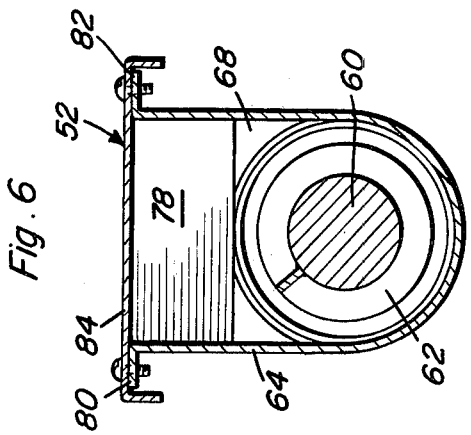
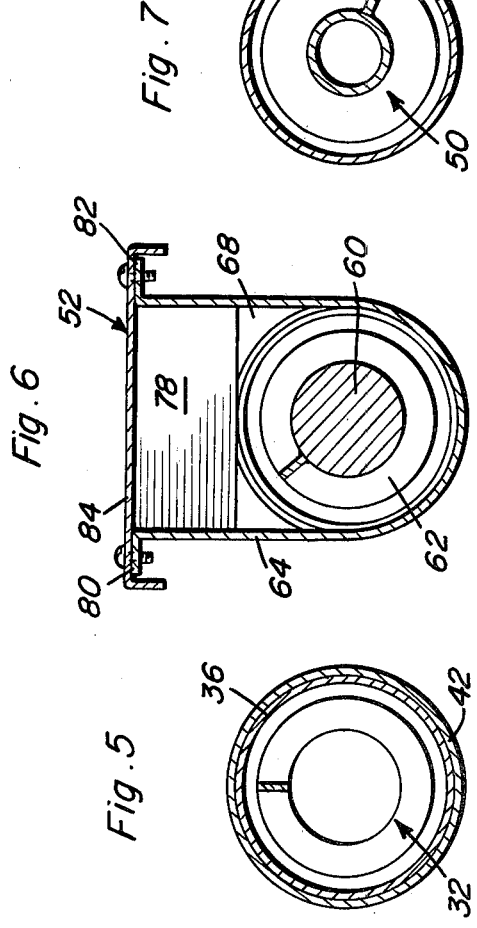

COMBINATION AUGER SYSTEM

BACKGROUND OF THE INVENTION

1. Field of the Invention

This invention relates generally to a combination auger system, and particularly to a system that combines a coreless auger and a core-type auger in a single material distributing system.

2. Description of the Prior Art

An auger feeding system commonly used for delivering food to poultry, hogs and the like, employs a coreless auger constructed in the form of a spiral coil similar to a coiled spring. While this coreless auger has the advantage of being flexible and is easily adaptable to situations where the material being conveyed must be elevated or otherwise passed from one plane to another, difficulties have been encountered with this coreless auger in that it permits the feed to slip by or jump over each one of the flightings forming the auger and consequently the coreless auger separates the coarse from the fine feed and does not deliver an even balance of ration to the poultry, hogs, and the like.

Another approach to distributing food to poultry, hogs, and the like, is to provide the spiral flights of the auger with a tube, or core, which forms a core-type auger that does not separate the feed being distributed. As can be readily appreciated, however, the presence of the core in the auger limits the flexibility of same and handicaps use of the auger in elevating and other applications where it is desirable, or even necessary, that the auger be bent around one or more corners.

Patent No. 2,646,023, issued July 21, 1953, to R. K. Virgil, discloses an automatic fowl feeding device using a flexible auger that extends from a hopper to a straight portion of a feeding trough. At the latter point, the auger is apparently connected to a worm. A difficulty arises in such an arrangement, however, since there is an inherent difficulty in transferring feed from the flexible screw to the worm, since the flexible screw is capable of handling more feed than can be handled by the worm arranged in a straight section. Unless the feed is throttled at the hopper so that the level of feed in the section provided when the flexible auger is operating only at a fraction of its capacity difficulties will be encountered at the transition from the flexible auger to the worm.

Additional prior patents believed pertinent to this invention are as follows:

| | | |
|---|---|---|
| 351,014 | A. Wissler | oct. 19, 1886 |
| 1,258,668 | F. G. Gauntt | Mar. 12, 1918 |
| 1,741,981 | B. Dewey et al | Dec. 31, 1929 |
| 2,742,139 | M. L. Smallegan | April 17, 1956 |
| 2,888,128 | C. S. Allen | May 26, 1959 |
| 3,278,001 | C. C. Andrews | Oct. 11, 1966 |
| 3,342,315 | C. S. Godley | Sept. 19, 1967 |
| 3,394,681 | P. D. Rigterink et al | July 30, 1968 |
| 3,451,531 | C. R. Barnes | June 24, 1969 |
| 3,580,384 | R. J. Pingree | May 25, 1971 |
| 3,726,392 | B. Rastoin | April 10, 1973 |

SUMMARY OF THE INVENTION

It is an object of the present invention to provide an auger system that combines a coreless auger and a core-type auger into an efficient, flexible unit.

It is another object of the present invention to provide an auger system capable of efficiently conveying materials with a change in elevation from the input to output of the system.

It is yet another object of the present invention to provide a coupling assembly for providing a smooth transition between a coreless auger and a core-type auger.

These and other objects are achieved according to the present invention by providing a combination auger system having: a first conveyor arranged for elevating a material from an input; a second conveyor arranged for receiving material from the first conveyor and distributing the material as desired; and a coupling assembly arranged for connecting together the first and second conveyors and providing a transition permitting smooth material flow between the conveyors. Preferably, the first conveyor is a coreless, flexible auger, and the second conveyor is a core-type substantially non-flexible auger.

The coupling assembly advantageously includes a core-to-coreless connector having a connecting shaft pivotally connected to an end of the core-type auger, and a stub shaft rigidly joined with the connecting shaft, the flight of the coreless conveyor being affixed to the stub shaft.

The coupling assembly advantageously further includes a housing for surrounding the core-to-coreless connector. This housing preferably has a section transverse to the conveying path formed by the first and second conveyors which is substantially larger than the corresponding sections of the conveyors for permitting the material being conveyed to boil and take a position outside a core of the core-type auger. This transition space is desirable because the space of the core of the core-type auger is unavailable for the material which previously had been lying in the bottom one-quarter to one-half of the tubing surrounding the coreless conveyor.

These together with other objects and advantages which will become subsequently apparent reside in the details of construction and operation as more fully hereinafter described and claimed, reference being had to the accompanying numerals refer to like parts throughout.

BRIEF DESCRIPTION OF THE DRAWINGS

FIG. 1 is a schematic diagram, partly in vertical longitudinal section, showing a combination auger system according to the present invention.

FIG. 2 is a fragmentary, vertical longitudinal sectional view, showing the lower left-hand portion of FIG. 1 drawn to a larger scale.

FIG. 3 is a fragmentary, sectional view taken generally along the line 3—3 of FIG. 2.

FIG. 4 is a fragmentary, side elevational view, partly broken away and in vertical longitudinal section, showing the transition portion of the auger system of FIG. 1 drawn to a larger scale.

FIG. 5 is a sectional view taken generally along the line 5—5 of FIG. 4.

FIG. 6 is a sectional view taken generally along the line 6—6 of FIG. 4.

FIG. 7 is a sectional view taken generally along the line 7—7 of FIG. 4.

FIG. 8 is a fragmentary, sectional view taken generally along the line 8—8 of FIG. 4.

FIG. 9 is a perspective view showing part of a housing for a coupling assembly according to the present invention.

DESCRIPTION OF THE PREFERRED EMBODIMENT

Referring now more particularly to FIG. 1 of the drawings, an auger system 10 according to the present invention has a first conveyor 12 arranged for elevating a material (not shown) such as animal feed, and the like, from the boot 14 of a conventional hopper 16 to a second conveyor 18 arranged for receiving the material from conveyor 12 and distributing the material in a predetermined manner. In the illustrated arrangement of a system 10 according to the invention, conveyor 18 is shown as arranged in a building 20 and is provided with a plurality of spouts, three spouts designated 22, 24 and 26 being illustrated, for dispensing the feed. A conventional drive 28 may be arranged at the outward end of conveyor 18 for driving both conveyors 12 and 18 in a manner which will become apparent below. While unit 28 is illustrated as being at the outward end of conveyor 18, it is to be understood that the unit could be arranged at, for example, boot 14 if desired. Further, while only a single assembly boot 14 has been shown in FIG. 1, it is to be understood that other boot and hopper configurations could be employed. For example, a twin or tandem boot could be employed in place of a single boot 14. A coupling assembly 30 according to the present invention is arranged connecting together conveyors 12 and 18 and simultaneously providing a transition area between the conveyors in a manner to be described in greater detail below.

Referring now more particularly to FIGS. 2–5 of the drawings, conveyor 12 advantageously includes a coreless, flexible auger 32 passing out of boot 14 by means of a tail shaft weldment 34 which forms a self-aligning sleeve-type bearing. Auger 32 is surrounded by a rigid, curved tubing, constructed from steel and the like, from a point just beyond boot 14 and the outer end of weldment 34 as by a suitable sleeve 38 and associated clamps. Moving from FIG. 2 to FIG. 4, tubing 36 is provided with a final elbow 40 adjacent the uppermost end thereof and is thus disposed so as to be joined by a sleeve 42, together with suitable clamps, to a length of straight tubing 44. The latter is arranged passing through an opening 46 in a wall 48 of building 20. In this manner, feed received from hopper 16 in boot 14 is elevated by auger 32 from boot 14 coupling assembly 30.

FIGS. 4 and 6–8 of the drawings show the construction conveyor 18. Advantageously, this second conveyor is in the form of a core-type non-flexible auger 50 connected to auger 32 within housing 52 of coupling assembly 30. The latter further includes a core-to-coreless connector 54 arranged within housing 52 and having a connecting shaft 56, for example, pivotally connected to an adjacent end of auger 50 as by a suitable pin 58. A stub shaft 60 is, for example, rigidly joined to connecting shaft 56 to complete connector 54, with flight 62 of auger 32 being affixed in a suitable, known manner, such as by welding, to stub shaft 60. It will be appreciated that the connection of auger 32 and auger 50 permits power to be transmitted one to the other. Further, although a solid stub shaft 60 is illustrated, it is to be understood that this shaft could be hollow if desired.

As perhaps best can be seen from FIGS. 4, 6, and 9 of the drawings, housing 52 includes a substantially U-shaped body 64 provided, in the lower bight portion thereof, with end walls 66 and 68 having openings provided therein surrounded by respective fittings 70, 72 arranged extending away from body 64 and the associated end wall. A tubing 74 which may be similar to tubing 36, but arranged straight instead of curved, shrouds auger 50 and is connected to housing 52 by fitting 72. The downspouts 22, 24 and 26 may be attached to tubing 74, and lengths of tubing extending therefrom, by keys connecting together tubing 74 and the other lengths of tubing associated therewith. A pair of deflectors 76 and 78 advantageously extend upwardly and inwardly from end walls 66 and 68 to further enhance the material expansion ability of coupling assembly 30 to provide a suitable transition between conveyors 12 and 18.

Flanges 80 and 82 are advantageously provided along the free ends of the leg portions of body 64 so as to permit selective attachment of the cover 84 thereto.

An additional advantage of a system 10 which combines a flexible coreless auger 32 and a substantially rigid core-type auger 50 is that attachment of the flight 62 of auger 32 to the core of auger 50, which core may be a hollow core as illustrated in FIG. 8, provides control of the flight 62 and reduces wear of same at the elbow 40, and similar bends. Thus, this arrangement alleviates a problem of wearing of flight 62 at the bends and in many instances on the straight sections. This wear is attributed to the necessity to keep the flighting tight to preserve its spring action, and, of course, this tight arrangement puts pressure on tubing 44 by the flight 62.

Agitators of various kinds can be incorporated into hopper 16, although such agitators are not a prerequisite for proper operation of a conveyor system according to the invention. Most granular materials do not require an agitator; however, some granular materials have a tendency to bridge in the bin or hopper which requires manual attention such as capping the holding bin or hopper, or the use of an agitator.

As mentioned above, hopper 16 may be either conventional bulk bin or holding hopper. When the input end of conveyor 12 is a holding hopper, the latter serves to introduce feed into the system at a predetermined rate.

A system 10 according to the present invention provides maximum flexibility in that the flexible auger 32 can convey materials through a curved tube 44 which facilitates the conveying of materials to a different elevation from the input point. Not only does the flexible auger portion of the system provide flexibility in changing elevation of the material being conveyed to desired location of elevation, it can also provide a flexibility in changing directions horizontally of an auger system from the input end of the system.

The present invention is particularly useful in adapting the flexibility of a flexible auger, while at the point in which the desired elevation for conveying feed, and the like, is reached, a solid core auger is desirable for conveying non-homogeneous material.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a first input auger conveyor including an outer tubing having generally straight opposite end portions and a curved intermediate portion, an auger screw disposed in and extending longitudinally along said tubing, corresponding first end portions of said screw and tubing including coacting supportive structure journaling said first end portion of said screw within said first end portion of said tubing, said screw including a coreless section extending from said supportive structure through said first end portion of said tubing, through said curved portion and through and projecting outwardly of the free end of the second end portion of said tubing remote from said curved portion, a second output auger conveyor having an outer tube and a core-type auger screw rotatable therein, one end of said second conveyor tube being endwise aligned with and spaced from the free end of said second end portion of the first conveyor tubing, an elongated housing having opposite end walls, said free end of the second end portion of the tubing of said first conveyor opening end-wise into said housing through one end wall thereof, said one end of said second conveyor tube opening into said housing through the other end thereof, said core-type auger screw projecting outwardly of said one end of said second conveyor tube and into said housing, the end of said coreless section projecting outwardly of said second end portion of said tubing being disposed within said housing and including a center longitudinal stub shaft projecting outwardly of the corresponding end of said coreless screw section, coupling means drivingly coupling the outer end of said stub shaft to the adjacent end of said core-type screw, said housing being closed and including a transverse sectional interior area considerably larger than the transverse sectional interior areas of said tubing and tube for permitting material being conveyed from said tubing into said tube to boil and take position outside the core of the core-type auger screw, the space of the core being unavailable for the material.

2. The combination of claim 1 wherein said coupling means establishes a pivotal connection between said outer end of said stub shaft and said adjacent end of said core-type screw for limited relative angular displacement between the outer end of said stub shaft and the core-type screw about an axis extending substantially diametrically of said core-type screw.

3. The combination of claim 1 wherein said housing includes a lower generally semi-cylindrical upwardly opening lower portion whose center axis of curvature substantially coincides with the center axes of the adjacent ends of said tube and tubing.

* * * * *